(12) United States Patent
Avadhanam et al.

(10) Patent No.: US 8,768,249 B2
(45) Date of Patent: Jul. 1, 2014

(54) MOBILE COMMUNICATION-DEVICE-CONTROLLED OPERATIONS

(75) Inventors: Phani Bhushan Avadhanam, San Diego, CA (US); Manas Abichandani, San Diego, CA (US); Nuthan Seegehalli Hanumanthappa, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 270 days.

(21) Appl. No.: 13/248,229

(22) Filed: Sep. 29, 2011

(65) Prior Publication Data

US 2013/0084797 A1 Apr. 4, 2013

(51) Int. Cl.
*H04B 5/00* (2006.01)

(52) U.S. Cl.
USPC ...... 455/41.1; 455/41.2; 455/550.1; 455/410; 455/411; 455/556.1; 455/418; 455/556.2; 341/20; 340/501; 345/173; 345/156

(58) Field of Classification Search
USPC ............ 455/41.2, 41.1, 410–411, 550.1, 418, 455/553.1, 435.1, 435.2, 556.1, 556.2; 340/501; 345/156, 173
See application file for complete search history.

(56) References Cited

U.S. PATENT DOCUMENTS

| | | | | |
|---|---|---|---|---|
| 8,040,233 B2 * | 10/2011 | Adappa et al. | ............ | 340/522 |
| 8,340,577 B2 * | 12/2012 | Griffin et al. | ............ | 455/41.2 |
| 8,346,217 B2 * | 1/2013 | Crawford et al. | ............ | 455/411 |
| 8,422,948 B2 * | 4/2013 | Griffin et al. | ............ | 455/41.1 |
| 8,441,441 B2 * | 5/2013 | Tsai et al. | ............ | 345/157 |
| 8,447,272 B2 * | 5/2013 | Faith et al. | ............ | 455/411 |
| 8,457,651 B2 * | 6/2013 | Forutanpour et al. | ...... | 455/456.1 |
| 8,463,186 B2 * | 6/2013 | Griffin et al. | ............ | 455/41.2 |
| 8,467,991 B2 * | 6/2013 | Khosravy et al. | ............ | 702/153 |
| 8,489,112 B2 * | 7/2013 | Roeding et al. | ............ | 455/456.1 |
| 8,502,775 B2 * | 8/2013 | Orchard et al. | ............ | 345/158 |
| 8,521,131 B1 * | 8/2013 | Ramalingam et al. | ........ | 455/410 |
| 2010/0299390 A1 * | 11/2010 | Alameh et al. | ............ | 709/204 |
| 2011/0077028 A1 * | 3/2011 | Wilkes et al. | ............ | 455/456.3 |
| 2011/0148752 A1 * | 6/2011 | Alameh et al. | ............ | 345/156 |
| 2011/0210922 A1 * | 9/2011 | Griffin | ............ | 345/173 |
| 2012/0009896 A1 * | 1/2012 | Bandyopadhyay et al. | .. | 455/411 |
| 2012/0042036 A1 * | 2/2012 | Lau et al. | ............ | 709/217 |
| 2012/0231838 A1 * | 9/2012 | Lyon et al. | ............ | 455/556.1 |
| 2012/0329486 A1 * | 12/2012 | Gits et al. | ............ | 455/466 |
| 2013/0046692 A1 * | 2/2013 | Grigg et al. | ............ | 705/44 |

* cited by examiner

*Primary Examiner* — Marceau Milord
(74) *Attorney, Agent, or Firm* — Neugeboren O'Dowd PC

(57) ABSTRACT

Methods and mobile devices for performing operations responsive to user actions are disclosed. The method includes prompting a user of a mobile device to make a particular action that is detectable by the mobile device, and prompting the user to select a particular operation that the user desires to have effectuated when the particular action is subsequently carried out. In addition, an indicator of the particular action is stored on the mobile device in connection with an indicator of the particular operation to associate the particular action with the particular operation. And after registration, when the particular action is sensed with the mobile device, the particular operation is effectuated.

15 Claims, 5 Drawing Sheets

MOBILE COMMUNICATION-DEVICE-CONTROLLED OPERATIONS

FIELD OF THE INVENTION

The present invention relates to computing devices. In particular, but not by way of limitation, the present invention relates to control of operations with a mobile computing device.

BACKGROUND OF THE INVENTION

Mobile touchscreen-enabled communication devices, such as smartphones (sometimes referred to as application phones) and tablet computers, are capable of running applications (e.g., educational, gaming, financial, and utility applications) that are useful in a variety of contexts. Increasingly, it is becoming more typical that these mobile communication devices include sensors such as touchscreens, accelerometers, and microphones to detect a user's actions, and applications have been developed that, to a limited extent, utilize some aspects of these sensors.

In addition, these mobile communication devices are often able to communicate, both over cellular communication links and over shorter-range communication links such as one or more of Wi-Fi, Bluetooth, radio-frequency identification (RFID), and near filed communication (NFC) links. Although applications have been developed to utilize these shorter-range communication links, these shorter-range communication links are currently underutilized and are not realizing their useful potential.

As a consequence, the potential for an enhanced user experience with these mobile communication devices is not currently being realized, at least, in part because the sensors (that operate as user interfaces) and the shorter-range communication capabilities of mobile communication devices are being underutilized.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Several aspects of the invention may include a communication device that includes a sensing component to sense user actions, a communication component to communicate data from the communication device to another communication device, and an application to associate a particular user action that is sensed by the sensing component with a particular type of data, and in response to the sensing component sensing the particular user action, the application selects the particular type of data and initiates a transfer of the particular type of data to the other communication device.

Aspects of the invention may also be characterized as a method for initiating an operation with a mobile device. The method includes prompting a user of the mobile device to make a particular action that is detectable by the mobile device, prompting the user to select a particular operation that the user desires to have effectuated when the particular action is subsequently carried out, and storing, in a memory of the mobile device, an indicator of the particular action in connection with an indicator of the particular operation to associate the particular action with the particular operation. In operation, the mobile device senses the user making the particular action, and the mobile device effectuates, responsive to the particular action being sensed, the particular operation.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
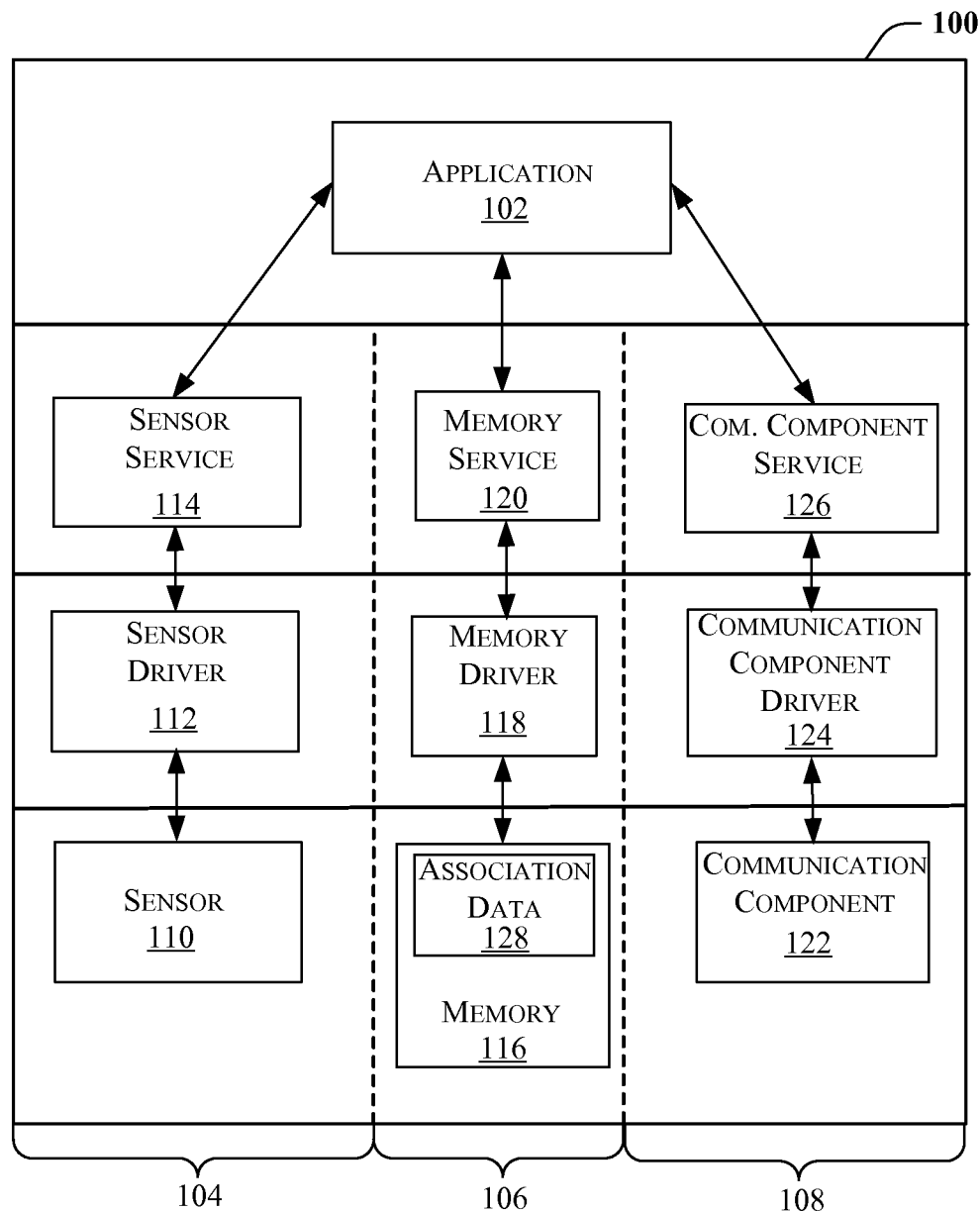
FIG. 1 illustrates a block diagram of a mobile communication device according to several embodiments of the present invention.

Referring first to FIG. 1, shown is a block diagram of a mobile communication device 100. As shown, the mobile communication device 100 includes an application 102 in communication with a plurality of functional stacks including a sensor stack 104, a memory stack 106, and a communication component stack 108. As shown, the sensor stack 104 includes a sensor 110, a sensor driver 112, and a sensor service 114; the memory stack 106 includes memory 116, a memory driver 118, and a memory service 120; and the communication component stack 108 includes a communication component 122, a communication component driver 124, and a communication component service 126.

The illustrated arrangement of the components depicted in FIG. 1 is logical, the connections between the various components are exemplary only, and the depiction of this embodiment is not meant to be an actual hardware diagram; thus, the components can be combined or further separated in an actual implementation, and the components can be connected in a variety of ways without changing the basic operation of the system. For simplicity, only a single sensor 110 and communication component 122 are depicted, but one of ordinary skill in the art will appreciate that the mobile communication device 100 may include several sensors of varying types (and several associated sensor stacks) and several communication components of varying types (and several associated communication component stacks). But this is certainly not required and other embodiments only use one sensor and one communication component in operation.

The mobile communication device 100 may be realized by a wireless communications device such as a smartphone, PDA, netbook, tablet, laptop computer and other wireless devices. But the mobile communication device 100 may work in tandem with wireline and wireless communication devices. In many implementations, the mobile communication device 100 includes components (not shown) associated with cellular communication to enable a user of the mobile communication device 100 to communicate by voice communication with others and to access remote networks, including the Internet, known cellular networks (e.g., CDMA, GPRS, LTE, and UMTS networks), and yet to be developed communication networks.

With respect to the application 102, it may be any of a variety of applications that perform or assist the performance of specific operations. As examples, without limitation, the application 102 may be a credit card selection application, an automobile operation application, an application for processing business cards, an application for transacting with an automated teller, and an application for operating an elevator.

The sensor 110 may be realized by a variety of sensing devices including a touchscreen, an accelerometer, a microphone, or other technologies that enable the mobile communication device 100 to sense one or more actions of a user. The memory 116 may be realized by a variety of non-transient memory storage components including non-volatile memory and RAM memory, and the communication component 122 may be realized by a variety of technologies including near field communication (NFC) technology, radio frequency identification (RFID) technology, Bluetooth technology, WiFi technology, and other communication technologies.

As one of ordinary skill in the art will appreciate, each of the sensor driver 112, memory driver 118, and communication component driver 124 generally functions to provide an abstraction for the sensor 110, the memory 116, and the communication component 122, respectively. And each of the sensor service 114, the memory service 120, and the communication component service 126 provides an interface for the application 102 to communicate with the sensor driver 112, memory driver 118, and communication component driver 124.

Figure 2:
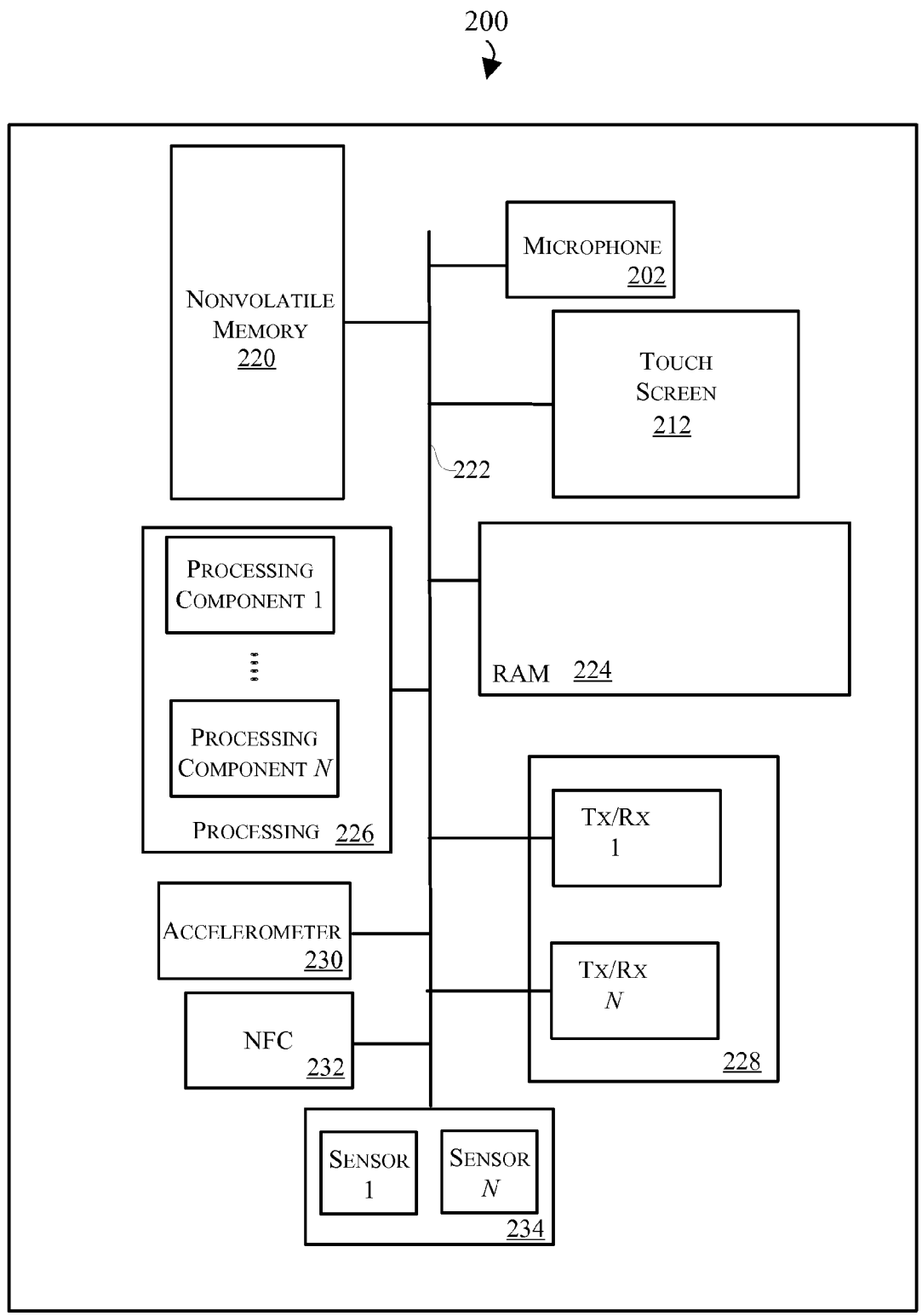
FIG. 2 is a block diagram depicting exemplary physical components of the mobile communication device depicted in FIG. 1.

Referring next to FIG. 2, shown is a block diagram depicting physical components of an exemplary mobile communication device 200 that may be utilized to realize the mobile communication device 100 described with reference to FIG. 1. As shown, the communication device 200 in this embodiment includes a microphone 202, a touchscreen 212, and nonvolatile memory 220 that are coupled to a bus 222 that is also coupled to random access memory ("RAM") 224, N processing components 226, and a transceiver component 228 that includes N transceivers, an accelerometer 230, and a near field communication (NFC) component 232, and a collection of N sensors 234. Although the components depicted in FIG. 2 represent physical components, FIG. 2 is not intended to be a hardware diagram; thus many of the components depicted in FIG. 2 may be realized by common constructs or distributed among additional physical components. Moreover, it is certainly contemplated that other existing and yet-to-be developed physical components and architectures may be utilized to implement the functional components described with reference to FIG. 2.

The microphone 202 generally operates to sense audio signals (e.g., the user's voice), process and convert those signals to a digital representation of the audio signals that may be utilized in connection with embodiments disclosed herein to control the mobile communication device 200. The touchscreen 212 generally operates to provide a presentation of content to a user and function as an input device for the user, and the touchscreen may be realized by any of a variety of touchscreen displays (e.g., LCD and OLED displays). And in general, the nonvolatile memory 220 functions to store (e.g., persistently store) data and executable code including code that is associated with the functional components depicted in FIG. 1. In some embodiments for example, the nonvolatile memory 220 includes bootloader code, modem software, operating system code, file system code, and code to facilitate the implementation of the application 102, the services 114, 120, 126, and the drivers, 112, 118, 124 discussed in connection with FIG. 1 as well as other components well known to those of ordinary skill in the art that are not depicted nor described in connection with FIG. 1 for simplicity.

In many implementations, the nonvolatile memory 220 is realized by flash memory (e.g., NAND or ONENAND memory), but it is certainly contemplated that other memory types may be utilized as well. Although it may be possible to execute the code from the nonvolatile memory 220, the executable code in the nonvolatile memory 220 is typically loaded into RAM 224 and executed by one or more of the N processing components 226.

The N processing components 226 in connection with RAM 224 generally operate to execute the instructions stored in nonvolatile memory 220 to effectuate the functional components depicted in FIG. 1. For example, when executed the application 102 may reside in RAM 224 and may be executed by one or more of the N processing components 226. In many implementations, the memory 116 described with reference to FIG. 1 is realized by the nonvolatile memory 220 and/or RAM memory 224. As one of ordinarily skill in the art will appreciate, the N processing components 226 may include a video processor, modem processor, DSP, graphics processing unit (GPU), and other processing components.

The transceiver component 228 includes N transceiver chains, which may be used for communicating with one or more networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The accelerometer 230 generally functions to provide one or more outputs indicative of an acceleration of the mobile communication device 200 in one, two, or three dimensions in space and may be used to sense an orientation of the mobile communication device 200. And the N sensors 234 generally function to sense the presence of other objects relative to mobile communication device 200 may be realized by a variety of sensors including magnetic-based sensors and/or pressure transducers.

Figure 3:
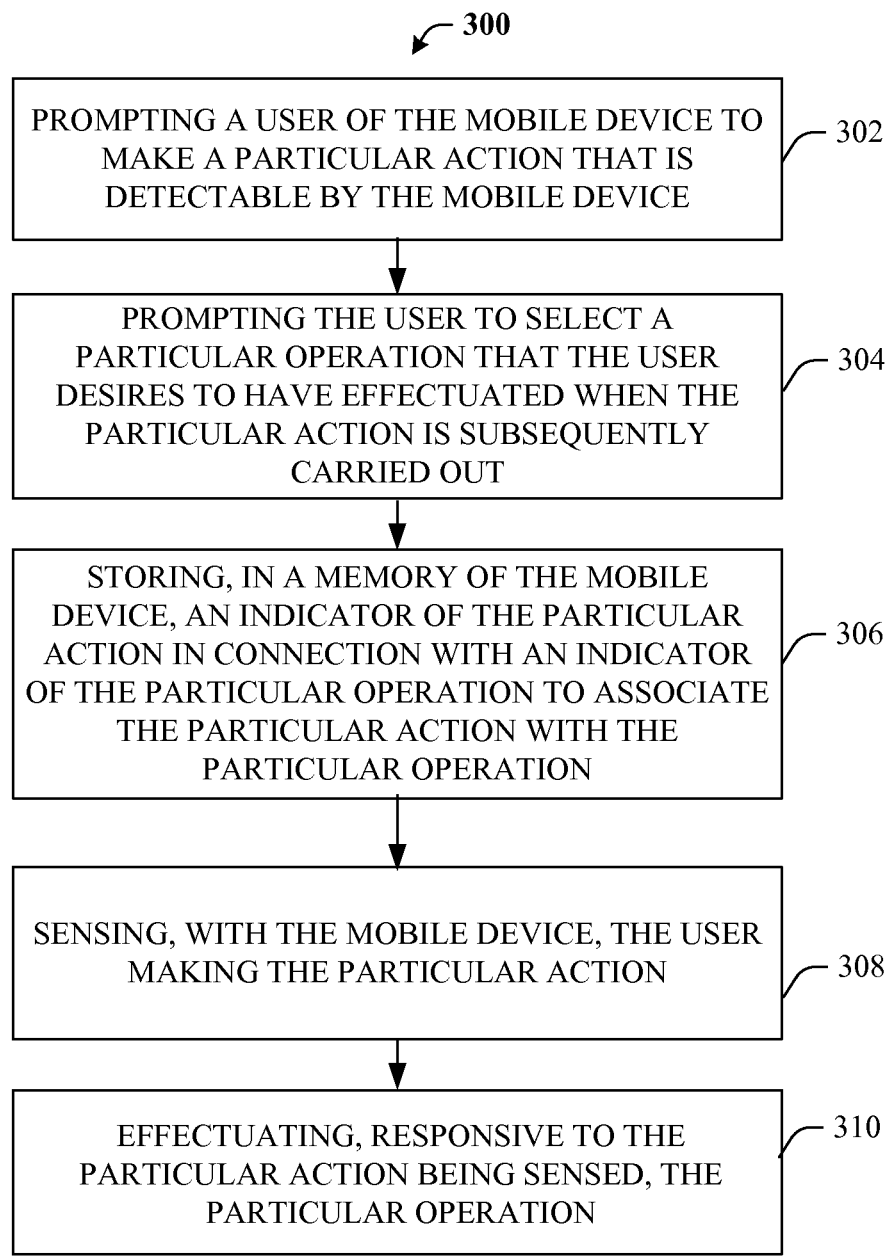
FIG. 3 is a flowchart depicting operations that may be carried out in connection with the mobile communication devices depicted in FIGS. 1 and 2.

While referring to FIGS. 1 and 2 simultaneous references are made to FIG. 3, which is a flowchart depicting an exemplary method that may be traversed by the mobile communication device 100 depicted in FIG. 1. As shown, Blocks 302, 304 and 306 depict steps associated with a registration phase of the exemplary method during which a user configures settings in advance of use. As shown, during the registration phase the application 102 prompts the user of the mobile communication device 100 to take a particular action that is detectable by the mobile communication device 100 (Block 302). In general, the action is a sequence of one or more physical actions carried out by the user that may be sensed by the sensor 110 (e.g., the microphone 202, touchscreen 212, and/or accelerometer 230) of the mobile communication device 100. As examples, the particular action that the user makes may include a particular translational or rotational movement (or sequence of movements) of the mobile communication device 100 that may be detected by the accelerometer 230, speech from the user that may be detected by the microphone 202, or a touchscreen gesture that is detected by the touchscreen 212.

In some implementations, the application 102 defines the potential types of actions that the user may perform. For example, the application 102 may limit the user to selecting a particular action (e.g., sequence of movements) that is detectable by the accelerometer 230 of the mobile communication device 100; or the application may limit the user to speaking a particular word, which is received by the microphone 202 of the mobile communication device; alternatively, the application 102 may limit the user to selecting a particular touchscreen-gesture that is sensed by the touchscreen 212 of the mobile communication device 100. In some implementations, the application 102 determines the available sensing hardware of the mobile communication device 100 and limits the actions that the user may select based upon the hardware capabilities of the mobile communication device 100.

As discussed further herein, the action made by the user may include a repeatable series of actions, and the actions may be selected based upon an intuitive connotation between the action and an operation that the user desires to effectuate when the action or actions are carried out. For example, a user may select an action that emulates a pour motion that is carried out when pouring a substance from one vessel to another vessel, and the pouring motion may be used in connection with depositing money in an automated teller machine. This is merely one example of a type of action that a user may select and others are disclosed further herein.

As shown in FIG. 3, the user is also prompted to select a particular operation that the user desires to have effectuated when the particular action is subsequently carried out (Block 304). For example, the application 102 in many implementations provides an interface for a user to select the particular operation from among a list of potential options. As discussed further herein, the application 102 may be an application that enables a user to select a credit card from among several available credit cards, and in that case, the application 102 may present a list of available credit cards that the user selects to correspond to the desired operation. Or alternatively, the application 102 could prompt the user to swipe a credit card to obtain the credit card data that the user wishes to use during a later transaction.

As depicted, an indicator of the particular action is stored in the memory 116 (e.g., nonvolatile memory 220 and/or RAM 224) of the mobile communication device 100 in connection with an indicator of the particular operation to associate the particular action with the particular operation (Block 306). As shown in FIG. 1, the association between the particular action and the particular operation is stored as association data 128, which may be persistently stored (e.g., in nonvolatile memory 220) for ongoing use (e.g., a user may associate a particular movement of the mobile communication device 100 with a default credit card selection), or the association may be temporarily stored (e.g., in RAM 224) for use in only the next operation (e.g., the next transaction).

Once the association between the particular action and the particular operation is stored as the association data 128, the user may utilize the particular action to prompt the mobile communication device 100 to carry out the particular operation.

More specifically, the mobile communication device 100 senses the user making the particular action (Block 308), and then effectuates, responsive to the particular action being sensed, the particular operation (Block 310). Referring to FIG. 1 for example, once the association data 128 is created and stored, the application 102 invokes the service level API of the sensor service 114 to prompt the sensor service 114 to communicate with the sensor driver 112 (e.g., accelerometer driver) so the sensor service 114 begins to register outputs of the sensor 110 via the sensor driver 112 to obtain an indication of actions of the user (e.g., particular movements, speech, and gestures). And the indication of the actions of the user is used in connection with the stored association data 128 to initiate execution of the particular operation (e.g., credit card selection).

More specifically, the sensor service 114 reads the outputs and converts or translates the outputs from the sensor driver 112 to a format that the application 102 can understand. In the context of the accelerometer 230 for example, the sensor service 114 can begin receiving data from the sensor driver 112 that is indicative of a user action and then inform the application 102 that a user action is underway so that the application 102 may begin to access the association data 128 in memory 116 to obtain the previously stored associations between the stored user-action-data (the indicators of the particular user actions) and particular operations to compare the sensed actions of the user with the stored association data 128.

In some implementations for example, the application 102 compares the sensed actions of the user with the stored association data 128 from the beginning of the action sequence—and as the user is carrying out the action sequence—so that by the time the user has completed the action (and in some instances before the user has completed the action) the application 102 has identified the particular operation the user desires to effectuate. As a consequence, an experience of the user is enhanced by the operation being quickly identified. And once an operation is identified, the user may be prompted by the application 102 to confirm that the user wants to effectuate the selected operation before application 102 initiates execution of the operation.

In general, the particular operation is an operation that the mobile communication device 100, at least in part, effectuates. For example, as described further herein with respect to several exemplary use cases, the operation may include a credit card selection, an operation on an automobile, processing of a datasheet (e.g., a business card), operation of an automated teller machine (ATM), and operation of an elevator. It should be recognized that these operations are merely exemplary and that other operations may be effectuated consistent with several embodiments disclosed herein.

Use-Case 1: Credit Card Selection

When a user has multiple credit cards that can be used for payment utilizing the mobile communication device 100, many implementations of the application 102 enable a user to select a particular credit card for payments via the communication component 122 (e.g., the NFC component 232). Although it is contemplated that other sensor types may be utilized, for exemplary purposes the credit-card-selection use case presently described is described in the context of the sensor 110 being realized by the accelerometer 230 and the communication component 122 being realized by the NFC component 232. As one of ordinary skill in the art will appreciate in view of this disclosure, when the sensor 110 is realized by the accelerometer 230, the application 102 will detect (via an accelerometer driver that is used to implement the sensor driver 112 and an accelerometer service that is used to implement the sensor service 114) the accelerometer 232 output to determine: 1) whether the user has moved the mobile communication device 100 in one direction or another direction (translational movement); 2) whether the user has tilted the mobile communication device 100 (rotational movement); and/or 3) an amount of dynamic acceleration that enables an analysis of the way the mobile communication device 100 is moving. And this information may be used to enable the user to select a particular credit card using a particular action that may include translational and/or rotational movement of the mobile communication device 100.

Consistent with the method described with reference to FIG. 3, the user initially invokes the application 102 to initiate a registration option, and then the user is prompted to move the mobile communication device 102 in a manner that is detectable by the accelerometer 230 of the mobile communication device 102. The movement may include translational movement and/or rotational movement, which may include continuous movements, discrete movements and combinations of continuous and discreet movements. Some potential translational movement types include, but are not limited to, the following:

- Moving the mobile communication device 100 from left to right;
- Moving the mobile communication device 100 from right to left;
- Moving the mobile communication device 100 from left to right, stopping, then moving the mobile communication device 100 again from left to right;
- Moving the mobile communication device 100 from right to left, stopping,
- then moving the mobile communication device 100 again from right to left; and
- Any combination of the above actions.

Some potential rotational movement types include, but are not limited to the following:

- Tilting the mobile communication device 100 from left to right;
- Tilting the mobile communication device 100 from right to left;
- Tilting the mobile communication device 100 from left to right, stopping, then tilting the mobile communication device 100 again from left to right;
- Tilting the mobile communication device 100 from right to left, stopping, then tilting the mobile communication device 100 again from right to left;
- Any combination of the above actions.

The particular actions of the user are sensed by the accelerometer 230 and the raw signals from the accelerometer 230 are converted by the sensor driver 112 in connection with the sensor service 114 into a data representation of the particular movements made by the user. As one of ordinary skill in the art will appreciate, a variety of different types of accelerometers are available that provide an electric signal as an output, and in several embodiments, a digital representation of the electric signal is captured over a time window to provide a data representation of the user's captured movement of the mobile communication device 100. As those of ordinary skill in the art will appreciate, the data representation of the user's movement may be stored as a hash value to reduce an amount of time required to look up a particular representations of the user's movement.

In addition to receiving the particular action (which in this use-case is a particular accelerometer movement), the application 102 prompts the user to enter or register the credit card information that the user wants to be associated with the particular accelerometer movements. For example, the credit card information may already reside within the mobile communication device 100, may be read into the mobile communication device 100 by a card reader (e.g., a swipe-style card reader) that is in communication with the mobile communication device 100, or the credit card information may be manually entered by the user. As discussed with reference to FIG. 2, a data representation of the particular action (in this use-case the particular accelerometer 230 movement) is stored in memory 116 in connection with the credit card information to generate the association data 128. In many implementations, the user may generate several associations in the association data 128 so that each of a plurality of actions is associated with a corresponding one of a plurality of credit cards.

When the user desires to carry out a credit card transaction utilizing the association data 128, the user will be prompted by the application 102 to carry out a particular accelerometer-detectable action (e.g., translational and/or rotational movement) to select a credit card. For example, the application 102 may initiate the display of a demonstration graphic or a video clip that demonstrates how the user may select a credit card, and the demonstration may include a hint for the user that the particular action is a movement of the mobile communication device 100.

The user then makes the particular movement to select the desired credit card, and the application 102 identifies the desired card by comparing a data representation (e.g., hash value) of the sensed actions of the user with the association data 128. More specifically, the actions of the user are detected by the accelerometer 230 and converted to the data representation (by the accelerometer driver in connection with the accelerometer service), which the application 102 compares with previously stored data representations to find the desired credit card information that is stored in connection with data representation of the sensed actions.

The application 102 then communicates with the communication component service component 126, which in turn will assemble the data (e.g., credit card data) for the communication component driver 124, which packages the data for transmission by the communication component 122 to an intended recipient (e.g., retailer, other user, or other recipient).

In variations of this use-case, the sensor 110 is realized by an audio transducer (e.g., the microphone 202), and the application 102 is designed to prompt the user for a command or code word which is utilized to select a particular credit card. In these variations, during a registration phase the application 102 prompts the user to speak a command or generic code word into the microphone 202 of the mobile communication device 100.

The particular word or words selected by the user are picked up by the microphone 202 and the raw representation of the audio signals from the microphone 202 are converted by the sensor driver 112 in connection with the sensor service 114 into a data representation of the particular word or words spoken by the user. In many embodiments, a digital representation of the audio signals is captured over a time window to provide a data representation of the user's captured speech. As discussed above, the data representation of the user's speech may be stored as a hash value to reduce an amount of time required to look up a particular representations of the user's speech.

In addition to prompting the user to speak into the microphone 202, the application 102 prompts the user to enter or register the credit card information that the user wants to be associated with the particular spoken word or words. A data representation of the particular word or words is stored in memory 116 in connection with the credit card information to generate the association data 128.

When the user desires to carry out a credit card transaction utilizing the speech data within the association data 128, the user will be prompted by the application 102 to speak the word or words to select the credit card. For example, the application 102 may initiate the display of a demonstration graphic or a video clip that demonstrates how the user may speak into the microphone 202, and the demonstration may include a hint to the user that suggests the particular action word or words.

The user then speaks the particular word or words to select the desired credit card, and the application 102 identifies the desired card by comparing a data representation (e.g., hash value) of the sensed word or words of the user with the association data 128. More specifically, the word or words of the user are detected by the microphone 202 and converted to the data representation (by a microphone driver in connection with a microphone service), which the application 102 compares with previously stored data representations to find the desired credit card information that is stored in connection with data representation of the sensed word or words.

The application 102 then communicates with the communication component service component 126, which in turn will assemble the data (e.g., credit card data) for the communication component driver 124, which packages the data for transmission by the communication component 122 to an intended recipient (e.g., retailer, other user, or other recipient).

Use-Case 2: Automobile Control

Another set of operations that may be carried out in connection with several embodiments are automobile control operations. Although it is contemplated that other sensor types may be utilized, for exemplary purposes the automobile control use-case presently described is described in the context of the sensor 110 being realized by an the accelerometer 230 and the communication component 122 being realized by the NFC component 232.

As discussed above in connection with the description of use-case 1, when the sensor 110 is realized by the accelerometer 230, the application 102 will detect (via an accelerometer driver that is used to implement the sensor driver 112 and an accelerometer service that is used to implement the sensor service 114) the accelerometer 230 output to determine: 1) whether the user has moved the mobile communication device 100 in one direction or another direction (translational movement); 2) whether the user has tilted the mobile communication device 100 (rotational movement); and/or 3) an amount of dynamic acceleration that enables an analysis of the way the mobile communication device 100 is moving. And this information may be used to enable the user to select a particular automobile control operation using a particular action that may include translational and/or rotational movement of the mobile communication device 100.

Consistent with the method described with reference to FIG. 3, and in a similar manner as use-case 1, the user initially invokes the application 102 to initiate a registration option, and then the user is prompted to move the mobile communication device 102 in a manner that is detectable by the accelerometer 230 of the mobile communication device 100. The movement may include translational movement and/or rotational movement, which may include continuous movements, discrete movements and combinations of continuous and discreet movements. Examples of particular translational and rotational movements that may be utilized are discussed above with reference to use-case 1 and are not repeated here for brevity.

As discussed above, the particular actions of the user are sensed by the accelerometer 230 and the raw signals from the accelerometer 230 are converted by the sensor driver 112 in connection with the sensor service into a data representation of the particular movements made by the user. In addition to receiving the particular action (which in this use-case is a particular accelerometer movement), the application 102 prompts the user to enter or register the operation that the user wants to be associated with the particular accelerometer movements.

For example, the operations that may be effectuated by the mobile communication device 100 include locking the automobile, unlocking the automobile, setting a panic alarm for the automobile, and unlocking a trunk of the automobile. It should be recognized that these operations are only exemplary and that it is certainly contemplated that other automobile control operations may be carried out in connection with embodiments disclosed herein. In many implementations, the user may generate several associations in the association data 128 so that each of a plurality of particular actions is associated with a corresponding one of a plurality of automobile control operations.

When the user desires to carry out an automobile control operation utilizing the association data 128, the user will be prompted by the application 102 to carry out a particular accelerometer-detectable action (e.g., translational and/or rotational movement) to select a particular automobile control operation. For example, the application 102 may initiate the display of a demonstration graphic or a video clip that demonstrates how the user may select an automobile control operation, and the demonstration may include a hint to the user that the particular action is a movement of the mobile communication device 100.

The user then makes the particular movement to select the desired automobile control operation, and the application 102 identifies the desired control operation by comparing a data representation (e.g., hash value) of the sensed actions of the user with the association data 128. More specifically, the actions of the user are detected by the accelerometer 230 and converted to the data representation (by the accelerometer driver in connection with the accelerometer service), which the application 102 compares with previously stored data representations to find the desired automobile control operations that are stored in connection with data representations of the sensed actions.

The application 102 then communicates with the communication component service component 126, which in turn will assemble the automobile control command data for the communication component driver 124, which packages the data for transmission by the communication component 122 to an automobile (that is enabled with NFC technology) to effectuate the desired control operation.

Use-Case 3: Processing of Smart Data Cards

Another set of operations that may be carried out in connection with several embodiments are operations that may be carried out in connection with processing smart data cards, which may include electronic data that may be communicated by NFC technology or RFID technology among other potential technologies. Although it is contemplated that a variety of sensor types may be utilized depending upon the technology utilized in a smart data card, for exemplary purposes the processing-of-smart-cards use-case is described in the context of the sensor 110 being realized by the accelerometer 230 and the communication component 122 being realized by the NFC component 232.

As discussed above in connection with the description of use-case 1 and use-case 2, when the sensor 110 is realized by the accelerometer 230, the application 102 will detect (via an accelerometer driver that is used to implement the sensor driver 112 and an accelerometer service that is used to implement the sensor service 114) the accelerometer 230 output to determine 1) whether the user has moved the mobile communication device 100 in one direction or another direction (translational movement); 2) whether the user has tilted the mobile communication device 100 (rotational movement); and/or 3) an amount of dynamic acceleration that enables an analysis of the way the mobile communication device 100 is moving. And this information may be used to enable the user to select a particular automobile control operation using a particular action that may include translational and/or rotational movement of the mobile communication device 100.

Consistent with the method described with reference to FIG. 3, and in a similar manner as use-cases 1 and 2, the user initially invokes the application 102 to initiate a registration option, and then the user is prompted to move the mobile communication device 100 in a manner that is detectable by an accelerometer of the mobile communication device 100. The movement may include translational movement and/or rotational movement, which may include continuous movements, discrete movements and combinations of continuous and discreet movements. Examples of particular translational and rotational movements that may be utilized are discussed above with reference to use-case 1 and are not repeated here for brevity.

As discussed above, the particular actions of the user are sensed by the accelerometer 230 and the raw signals from the accelerometer 230 are converted by the sensor driver 112 in connection with the sensor service 114 into a data representation of the particular movements made by the user. In addition to receiving the particular action (which in this use-case is a particular accelerometer movement), the application 102 prompts the user to enter or register the operation that the user wants to be associated with the particular accelerometer movements.

For example, the smart data card may be a business card that includes an NFC chip with business contact information, and the operations that may be effectuated by the mobile communication device 100 include saving the contact name from the business card to a list of contacts stored on the mobile communication device 100; calling the number in the business card; opening a URL in the business card; and sending an email address in the business card to another recipient. In many implementations, the user may generate several associations in the association data 128 so that each of a plurality of particular actions is associated with a corresponding one of a plurality of operations related to a smart data card.

When the user desires to carry out operations related to a smart data card utilizing the association data 128, the user will be prompted by the application 102 to carry out a particular accelerometer-detectable action (e.g., translational and/or rotational movement) to select a particular operation. For example, the application 102 may initiate the display of a demonstration graphic or a video clip that demonstrates how the user may select a particular smart-data-card-related operation, and the demonstration may include a hint to the user that the particular action is a movement of the mobile communication device 100.

The user then makes the particular movement to select the desired smart-data-card-related operation, and the application 102 identifies the desired smart-data-card-related operation by comparing a data representation (e.g., hash value) of the sensed actions of the user with the association data 128. More specifically, the actions of the user are detected by the accelerometer 230 and converted to the data representation (by the accelerometer driver in connection with the accelerometer service), which the application 102 compares with previously stored data representations to find the desired smart-data-card-related operations that are stored in connection with data representations of the sensed actions.

The application 102 then communicates with the communication component service component 126, which in turn initiates the operation associated with the user's selection to effectuate the desired operation. For example, the application 102 may launch a browser, email application, dialer application, or contacts application.

Use-Case 4: Automated Teller Machine Operation

When a user wants to utilize an automated teller machine (ATM) for banking transactions, many embodiments enable the user to perform most of the preparation for the transaction—in advance of interacting with the ATM—using the mobile communication device 100. For example, details such as the account, amount of funds to be withdrawn, denomination of the bills to be withdrawn, etc., may be entered by the user before the user is at the ATM counter, and as a consequence, when it is the user's turn at the ATM, the user may place the mobile communication device 100 near the ATM counter to transmit the pre-assemble transaction information to the ATM (e.g., using NFC communications) thereby increasing the efficiency of ATM transactions and reducing a wait time for ATM based banking.

Although it is contemplated that other sensor types may be utilized, for exemplary purposes the ATM-operation use-case presently described is described in the context of the sensor 110 being realized by the touchscreen 212 and the communication component 122 being realized by the NFC component 232. As one of ordinary skill in the art will appreciate in view of this disclosure, when the sensor 110 is realized by the touchscreen 212, the application 102 will detect (via a touchscreen driver that is used to implement the sensor driver 112 and a touchscreen service that is used to implement the sensor service 114) the touchscreen 212 output to determine whether the user has made a gesture on the touchscreen 212.

Consistent with the method described with reference to FIG. 3, the user initially invokes the application 102 to initiate an ATM registration option, and then the user is prompted to take a particular action that may include the user drawing a pattern or particular gesture on the touchscreen of the mobile communication device 102 that the user will subsequently use to carry out an ATM-related operation. Examples of gestures include, but are not limited to, combinations of horizontal, vertical, and/or diagonal patterns that may be preset, and may also include gestures that indicate letters.

The particular actions of the user that are sensed by the touchscreen 212 and the raw signals from the touchscreen 212 are converted by the sensor driver 112 in connection with the sensor service 114 into a data representation of the particular action made by the user. In addition to receiving the particular action (which in this use-case is a particular touchscreen 212 gesture), the application 102 prompts the user to enter or register the operation that the user wants to be associated with the particular gesture. In many implementations, the user may generate several associations in the association data 128 so that each of a plurality of gestures is associated with a corresponding one of a plurality of ATM banking operations. In some implementations the association(s) are stored in the application's 102 memory (e.g., RAM memory), but non-transient associations between gestures and ATM banking operations may also be stored in non-transient memory (e.g., the nonvolatile memory 220).

For example, the ATM banking operations that may be effectuated by the mobile communication device 100 include depositing money, withdrawing money, making an account inquiry, transferring money between accounts, and any other ATM-related transactions. It should be recognized that these operations are only exemplary and that it is certainly contemplated that other ATM banking operations may be carried out in connection with embodiments disclosed herein.

When the user desires to carry out a particular ATM banking operation utilizing the association data 128, the user will be prompted by the application 102 to carry out a particular gesture of the user's choice to select the particular ATM banking operation. For example, the application 102 may initiate the display of a demonstration graphic or a video clip that demonstrates how the user may select an ATM banking operation, and the demonstration may include a hint to the user that the particular action is a touchscreen gesture of the mobile communication device 100.

The user then makes the particular movement to select the desired ATM banking operation, and the application 102 identifies the desired ATM banking operation by comparing a data representation (e.g., hash value) of the sensed actions of the user with the association data 128. More specifically, the actions of the user are detected by the touchscreen 212 and converted to the data representation (by the touchscreen driver in connection with the touchscreen service), which the application 102 compares with previously stored data representations to find the desired ATM banking operation that is stored in connection with data representations of the sensed actions.

The application 102 then communicates with the communication component service 126, which in turn sends an ATM banking command and/or data (depending upon the desired operation) to the communication component driver 124, which packages the data for transmission by the communication component 122 to an ATM to effectuate the desired ATM banking operation.

For example, if the user wants to withdraw money, a suitable pattern may be drawn on the touchscreen 212, and the application 102 will interpret the gesture and have the information ready to be transmitted to an NFC supported ATM machine. The application 102 will have the details necessary for the transaction before the user's turn at the ATM counter so that when the user places the mobile communication device 100 near an NFC reader on the ATM counter, the mobile communication device 100 will send the appropriate details for the particular operation or operations to the NFC reader of the ATM. Because all the details needed for the transaction are preselected by the user, the only step that needs to be carried out for the transaction is the transmission of the detailed transaction via the NFC link between the mobile communication device 100 and the ATM. Once the data transmission is complete, the user will collect the requested cash (if a withdrawal was made) or otherwise finish the transaction.

Unique Gestures for Automated Teller Machine Operation

In many implementations, the mobile communication device 100 is configured to enable many unique gestures to be utilized in connection with one or more ATM banking operations including a physical push gesture and a pouring or tapping feature.

Physical Push Gesture

Figure 4:
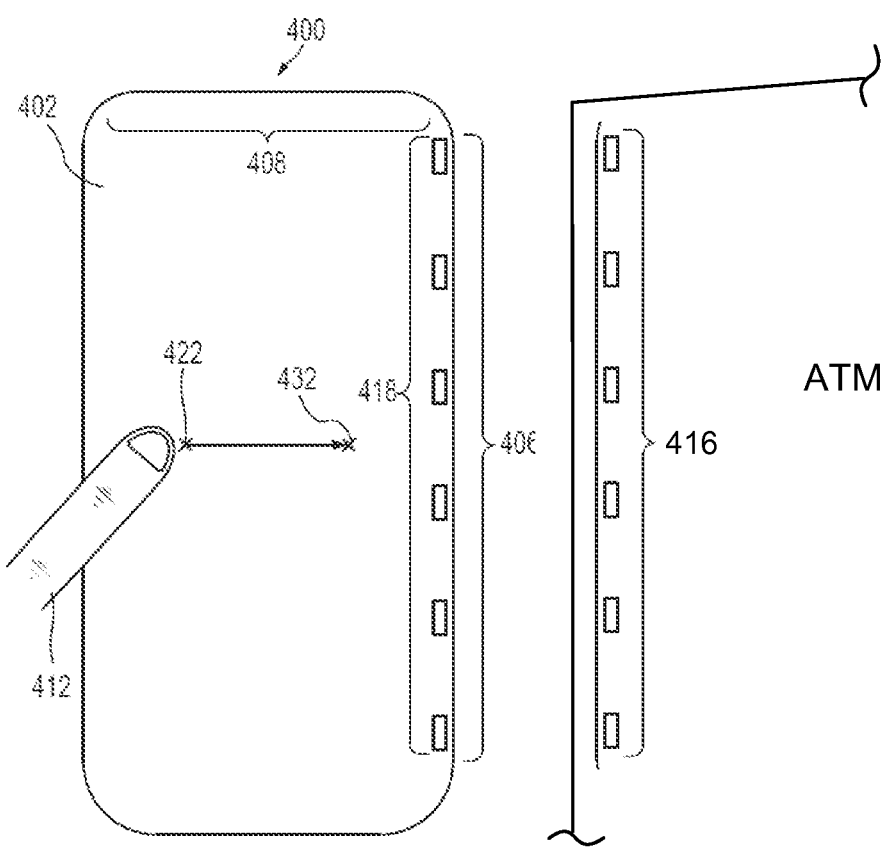
FIG. 4 is a diagram depicting an exemplary mode of operation of the mobile communication devices depicted in FIGS. 1 and 2.

A physical push gesture is one unique gesture that may be utilized in connection with embodiments discussed herein. As depicted in FIG. 4, a mobile communication device 400 is depicted on the left and an ATM with an NFC reader is depicted on the right. As shown, in this implementation the user can physically move their finger 412 from left to right on the touchscreen 402 to indicate the movement of funds from an account that is represented on the mobile communication device 400 to the ATM. To initiate this type of gesture, the user may first select the funds to be withdrawn or deposited by selecting the amount on a user interface that is generated by the application 102 on the touchscreen 402. The user may then swipe in a direction of the ATM using one or more fingers, and the direction of the swipe depends upon where the ATM is physically located relative to the mobile communication device 400.

As depicted in FIG. 4, the mobile communication device 400 may include one or more sensors 406 (e.g., sensors 234) to detect the presence of the ATM when the one or more sensors 406 of the mobile computing device 410 are placed proximally to ATM sensors 416. The sensors 406, 416 may be realized by pressure sensors, magnetic sensors, and/or any other sensor-type adapted to detect the presence of another device. In the depicted embodiment, the location of the ATM relative to the mobile communication device 400 may be determined based on which of the one or more sensors 406 on the mobile communication device 400 detect the ATM. For example, it is contemplated that at the one or more sensors 406 may be located about an entire perimeter of the mobile communication device 400 including an area of the mobile communication device 400 such as, but not limited to, a top portion 408 of the mobile communication device 400. In such an embodiment, if the one or more sensors 406 located in the top portion 408 of the mobile computing device 400 detect the presence of the ATM and the one or more sensors 406 located in a right-side portion 418 of the first mobile computing device 400 fail to detect the ATM, the ATM may be determined to be located proximate to the top portion 408 of the mobile computing device 400.

In operation, when the application 102 is realized as an ATM transaction application, the user may invoke the application 102 and in advance of approaching the ATM, the user may enter the transactions (e.g., withdrawal, inquiry, deposit, etc.) that the user desires to take place with the ATM. And when it is the user's turn at the ATM, the user may place the mobile communication device 400 in close proximity to the ATM so that the sensors 406 in the mobile communication device 400 sense the sensors 416 in the ATM, and vice versa, which may prompt the mobile communication device 400 and the ATM to begin, via NFC communication link, an initial handshake routine in which the ATM prompts the mobile communication device 400 for the user's credentials. And once the ATM has validated that the user has authority to access the user's account, the ATM may prompt the mobile communication device 400 to begin the transaction.

In response to the ATM prompting the mobile communication device 400 to begin the transaction, the application 102 may generate a notification such as a graphical display on the touchscreen 402 or an audible prompt to inform the user that the transaction may begin. In the context of a deposit, as depicted in FIG. 4 for example, upon selecting the funds to transfer, a user may place his or her finger on the touchscreen 402 of the mobile communication device 400 and slide their finger towards the location of the ATM. The application 102 then receives (via touchscreen driver and touchscreen service) an indication of the direction of movement of the finger and the application 102 and determines that the direction of movement of the finger is in the direction of the ATM. For example, the application 102 may calculate a first touching location 422 where the user's finger 412 first touched the touchscreen 402. The application 102 may also calculate a second touching location 432 where the user's finger 412 last touched the touchscreen 402.

In alternative modes of operation, instead of the user sliding their finger 412 from the first touching location 422 to the second touching location 432, it is contemplated that the user may also tap the touchscreen 402 at the first touching location 422 and the second touching location 432, and the application 102 may determine whether the second touching location 432 is closer to the one or more sensors 406 detecting the ATM than the first touching location 422; and if so, the application 102 may transfer the funds to the ATM. If not, then the application 102 may inform the user that the ATM is not located in that direction and the transaction cannot be effectuated. In addition, the ATM may include components that are substantially similar to the mobile computing device 400 and an application running on the ATM may be adapted specifically to interact with the application 102 on the mobile computing device 400.

Additional details of the operation of an accelerometer that may be utilized in connection with this embodiment are disclosed in pending U.S. patent application Ser. No. 13/216,002 entitled Data Transfer Between Mobile Computing Devices, filed Aug. 23, 2011, and which is incorporated herein by reference in its entirety.

Pouring or Tapping Gesture

Figure 5:
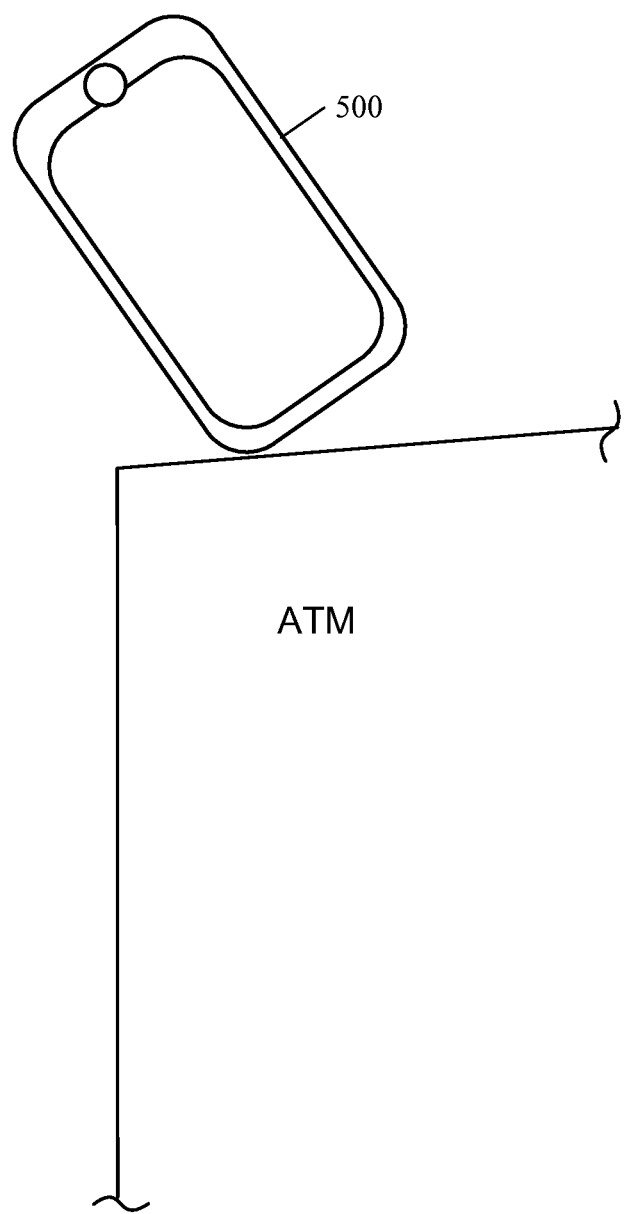
FIG. 5 is a diagram depicting another exemplary mode of operation of the mobile communication devices depicted in FIGS. 1 and 2.

Referring next to FIG. 5, depicted is another unique gesture that may be utilized in connection with several modes of operation. As shown, the mobile communication device 500 in this embodiment is configured to enable a user to effectuate an ATM-related transaction by moving the mobile communication device 500 with a motion that mimics a pouring motion.

In general, the mobile communication device 500 in this embodiment operates in a similar manner to the mobile communication device 400 described with reference to FIG. 4 to enable a user to select a type of transaction and select associated accounts in advance of approaching the ATM, and to authenticate the user when the user is at the ATM. But in this embodiment, once the user of the mobile communication device 500 is authenticated, the user may tilt the mobile communication device 500 as if funds are being poured into the ATM from the mobile communication device 500. For example, the application 102 may be adapted so that when a user gently taps the mobile communication device 500 to the ATM, the tap event is interpreted as a starting of a transaction (e.g., a fund transfer) between the mobile communication device 500 and the ATM.

In many variations of this embodiment, outputs of sensors 234 and an accelerometer 230 of the mobile communication device 500 are both utilized by the application 102 to determine a position of the mobile communication device 500 relative to the ATM and to detect movement of the mobile communication device 500. Additional details of the interoperation of sensors and an accelerometer that may be utilized in connection with this embodiment are disclosed in the above-identified pending U.S. patent application Ser. No. 13/216,002 entitled Data Transfer Between Mobile Computing Devices, filed Aug. 23, 2011, and which is incorporated herein by reference in its entirety.

Use-Case 5: Automated Elevator Operation

Another application of several embodiments is an automated operation of an elevator. For example, the application 102 may be designed so that a user may configure elevator-control operations of the mobile communication device 100 during a registration phase that may be subsequently utilized each time the user utilizes particular elevators (e.g., while the mobile communication device 100 is in the user's pocket).

Although it is contemplated that other sensor types may be utilized, for exemplary purposes the elevator operation use-case presently described is described in the context of the sensor 110 being realized by a touchscreen and the communication component 122 being realized by an the NFC component 232.

Consistent with the method described with reference to FIG. 3, the user initially invokes the application 102 to initiate an elevator operation registration option, and then the user is prompted to take a particular action that may include the user drawing a pattern or particular gesture on the touchscreen of the mobile communication device 102 that the user will subsequently use to carry out an elevator-related operation. Examples of gestures include, but are not limited to, combinations of horizontal, vertical, and/or diagonal patterns that may be preset, and may also include gestures that indicate letters.

The particular actions of the user are sensed by the touchscreen 212 and the raw signals from the touchscreen 212 are converted by the sensor driver 112 in connection with the sensor service 114 into a data representation of the particular action made by the user. In addition to receiving the particular action (which in this use-case is a particular touchscreen gesture), the application 102 prompts the user to enter or register the elevator-related operation that the user wants to be associated with the particular gesture. In many implementations, the user may generate several associations in the association data 128 so that each of a plurality of gestures is associated with a corresponding one of a plurality of elevator-related operations. In some implementations the association(s) is stored in the application's 102 memory (e.g., RAM 224), but non-transient associations between gestures and elevator-related operations may also be stored in non-transient memory (e.g., nonvolatile memory 220).

For example, the elevator control operations that may be effectuated by the mobile communication device 100 include going up to a particular floor and going down to a particular floor. It should be recognized that these operations are only exemplary and that it is certainly contemplated that other elevator control operations may be carried out in connection with embodiments disclosed herein.

This elevator-control implementation can be expanded to integrate signals from a global positioning satellite (GPS) receiver in the mobile communication device 100. For example, the GPS receiver of the mobile communication device 100 may be utilized to create an association between different buildings (e.g., the user's work, home, or any other location of frequent use) and different floors where the user typically travels to. This GPS-related information is not transmitted anywhere, but it may be used to decide what control instructions are sent to particular elevators.

In operation, whenever the user walks into an elevator, the application 102 may receive GPS information on the mobile communication device 100 to determine if the user is at the place of work, home or some other pre-registered location. The user will make the gesture or draw the pattern that was entered during the registration phase in connection with a particular elevator operation. For example, if the user wants to go to a particular floor, the pattern the user previously associated with that floor is drawn. But it should be recognized that use of the GPS information is optional and that location information that identifies the building where a particular elevator resides may be manually entered by the user.

The application 102 will receive information from the touchscreen service and interpret the gesture so the elevator operation information is ready to be transmitted to the elevator in the building. The user may configure the application 102 so that the application has all the details needed for the transaction ready in advance of the user arriving at the elevator, and when the user arrives at the elevator, the application 102 on the mobile communication device 100 is ready to transmit all the information over the NFC link when the user actually places the mobile communication device 100 near an NFC reader on the elevator. The application 102 then communicates with the communication service component 126 (e.g., the NFC component 232), which in turn sends the appropriate details related to the transaction to the NFC reader on the elevator. Since all the details needed for the transaction are already preselected by the user, the only step that is needed is final transmission of the detailed transaction via the NFC link. Once that is done, the elevator will perform the needed operation.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A communication device, the communication device comprising:
    a sensing component to sense user actions wherein the sensing component includes a touchscreen, and the user actions that are sensed by the touchscreen include a user contacting the touchscreen with a particular gesture;
    a communication component to communicate data from the communication device to another communication device;
    nonvolatile memory to store credit card numbers for a plurality of corresponding credit cards and to associate each credit card number with data that defines the particular gesture that is detectable by the sensing component; and
    an application to associate the particular gesture that is sensed by the sensing component with a particular credit card during a registration phase, and in response to the sensing component subsequently sensing the particular gesture, the application selects the particular credit card and initiates a transfer of card data for the particular credit card to the other communication device.

2. The communication device of claim 1, wherein the sensing component includes an accelerometer and the user action that is sensed by the sensing component includes one or more of translational and rotational movement.

3. The communication device of claim 1, wherein the communication component includes one of a NFC communication component and a blue tooth communication component.

4. A method for initiating an operation with a mobile device, the method comprising:
    prompting a user of the mobile device to make a particular action that is detectable by the mobile device;
    prompting the user to select a particular credit card that the user desires to use when the particular action is subsequently carried out;
    storing, in a memory of the mobile device, an indicator of the particular action in connection with an indicator of the particular credit card to associate the particular action with the particular credit card;
    sensing, with the mobile device, the user making the particular action wherein sensing includes sensing the particular action with a touchscreen of the transportable device, the particular action including a particular gesture that the user enters on the touchscreen; and
    effectuating, responsive to the particular gesture being sensed, a transmission of data identifying the particular credit card to enable the user to use the particular credit card.

5. The method of claim 4, wherein the sensing includes sensing the particular action with an accelerometer that is integrated with the mobile device, the particular action including one of moving the mobile device or tilting the mobile device.

6. The method of claim 4, wherein sensing includes sensing the particular action with a microphone of the mobile device, the particular action including the user speaking one or more particular words.

7. The method of claim 4, wherein the effectuating includes effectuating the transmission using an NFC component of the mobile device.

8. A communication device, the communication device comprising:
    means for prompting a user of the mobile device to make a particular action that is detectable by the mobile device;
    means for prompting the user to select a particular credit card that the user desires to use when the particular action is subsequently carried out;
    means for storing, in a memory of the mobile device, an indicator of the particular action in connection with an indicator of the particular credit card to associate the particular action with the particular credit card;
    means for sensing, with the mobile device, the user making the particular action wherein the means for sensing includes means for sensing the particular action with a touchscreen of the mobile device, the particular action including a particular gesture that the user enters on the touchscreen; and
    means for effectuating, responsive to the particular gesture being sensed, a transmission of data identifying the particular credit card to enable the user to use the particular credit card.

9. The communication device of claim 8, wherein the means for sensing includes means for sensing the particular action with an accelerometer that is integrated with the mobile device, the particular action including one of moving the mobile device or tilting the mobile device.

10. The communication device of claim 8, wherein the means for sensing includes means for sensing the particular action with a microphone of the mobile device, the particular action including the user speaking one or more particular words.

11. The communication device of claim 8, wherein the means for effectuating includes means for effectuating the transmission using an NFC component of the mobile device.

12. A non-transitory, tangible computer readable storage medium, encoded with processor readable instructions to perform a method for initiating an operation with a mobile device, the method comprising:
    prompting a user of the mobile device to make a particular action that is detectable by the mobile device;
    prompting the user to select a particular credit card that the user desires to use when the particular action is subsequently carried out;
    storing, in a memory of the mobile device, an indicator of the particular action in connection with an indicator of the particular credit card to associate the particular action with the particular credit card;
    sensing, with the mobile device, the user making the particular action wherein sensing includes sensing the particular action with a touchscreen of the mobile device, the particular action including a particular gesture that the user enters on the touchscreen; and effectuating, responsive to the particular gesture being sensed, a transmission of data identifying the particular credit card to enable the user to use the particular credit card.

13. The non-transitory, tangible computer readable storage medium of claim 12, wherein the sensing includes sensing the particular action with an accelerometer that is integrated with the mobile device, the particular action including one of moving the mobile device or tilting the mobile device.

14. The non-transitory, tangible computer readable storage medium of claim 12, wherein sensing includes sensing the particular action with a microphone of the mobile device, the particular action including the user speaking one or more particular words.

15. The non-transitory, tangible computer readable storage medium of claim 12, wherein the effectuating includes effectuating the transmission using an NFC component of the mobile device.

\* \* \* \* \*